United States Patent [19]

Trolle

[11] Patent Number: 4,550,658
[45] Date of Patent: Nov. 5, 1985

[54] DEVICE FOR SORTING AND COMPRESSING PACKAGINGS, PRINCIPALLY BEVERAGE CANS, IN SEVERAL STAGES

[76] Inventor: Sten Trolle, Skansgränd 7, Ystad, Sweden

[21] Appl. No.: 492,028
[22] PCT Filed: Aug. 16, 1982
[86] PCT No.: PCT/SE82/00259
§ 371 Date: Apr. 14, 1983
§ 102(e) Date: Apr. 14, 1983
[87] PCT Pub. No.: WO83/00643
PCT Pub. Date: Mar. 3, 1983

[30] Foreign Application Priority Data
Aug. 18, 1981 [SE] Sweden ............... 8104892

[51] Int. Cl.⁴ .................. B30B 15/30; B07C 5/34
[52] U.S. Cl. .................. 100/215; 100/233; 100/902; 209/557; 209/599; 209/699; 209/930
[58] Field of Search ............ 209/557, 599, 629, 630, 209/682, 699, 909, 930, 940; 100/91, 215, 233, 902

[56] References Cited

U.S. PATENT DOCUMENTS

| | | | |
|---|---|---|---|
| 2,619,150 | 11/1952 | Smith | 100/215 X |
| 2,737,995 | 3/1956 | Jennings | 100/215 X |
| 3,062,130 | 11/1962 | Huber et al. | 100/215 X |
| 3,412,675 | 11/1968 | Killough et al. | 100/215 |
| 4,265,170 | 5/1981 | Schulze, Jr. | 100/91 X |
| 4,436,026 | 3/1984 | Imamura et al. | 100/215 X |
| 4,454,028 | 6/1984 | Vetter et al. | 209/557 X |

FOREIGN PATENT DOCUMENTS 56-14097 2/1981 Japan ............... 100/902

Primary Examiner—Robert B. Reeves
Assistant Examiner—Edward M. Wacyra
Attorney, Agent, or Firm—Roberts, Spiecens & Cohen

[57] ABSTRACT

A device for sorting packagings such as cans having overall dimensions within a pre-determined range as regards length and diameter, comprising a first sorting stage, including a pivoted supporting member for carrying the packagings and a frame with an opening through which the supporting member is movable to the second stage. The second stage includes pressing members cooperating with the supporting member to effect axial compression of the packagings carried by the supporting member. The opening of the frame is of a size which limits the dimension in at least one direction of the packagings passing through the opening. The second stage is provided with a second opening through which compressed packagings pass whereby the second opening maximizes the axial length of the compressed packagings which pass through the second opening and are thereby sorted out.

9 Claims, 10 Drawing Figures

DEVICE FOR SORTING AND COMPRESSING PACKAGINGS, PRINCIPALLY BEVERAGE CANS, IN SEVERAL STAGES

BACKGROUND OF THE INVENTION

The present invention relates to a device for sorting packagings, principally beverage cans, in several stages and more precisely to a device incorporating two sections, one of which, the loader, is designed as both a loading member and a sorting member.

Sorting articles or goods according to such properties as size, shape, colour, material, density, etc. is known. In the case of sorting based on size or shape, the actual dimensions of the articles or goods form the basis of sorting.

SUMMARY OF THE INVENTION

An object of the present invention is to provide a substantial rationalization of the handling of returned packagings such as beverage cans.

In a device according to the invention the packaging is received by a member, henceforth called the loader, which comprises both the loading member and the sorting member. The loader transfers the packagings to a second sorting stage in which they are subjected to a compressive force in order to permit continued sorting based on the degree and nature of the deformation and/or final shape thus given to each packaging.

The loader consists principally of at least two members arranged so as to be capable of moving relative to each other, which individually or in combination sort out, for transfer to the second sorting stage, every packaging having dimensions within a predetermined size.

The second sorting stage is located in a second part of the device, henceforth called the pressing section. In this section pressing members arranged to describe relative motion towards or away from each other subject the packagings to a compressive force. Packagings with given physical properties are thereby compressed to a size permitting them to pass through a dimension-determining opening and principally to a collecting device.

In one version of the invention specially adapted for cylindrically shaped packagings the loader is arranged with substantially vertical supports at a distance from each other slightly in excess of a certain established diameter of the packagings. Arranged at the lower ends of the supports are protuberances oriented towards the received packaging at a distance from each other slightly less than said established diameter. Packagings having the established diameter are carried by the loader on the protuberances and then mainly occupy the opening formed between them. Packagings having a diameter less than the distance between the protuberances are sorted out in that such packagings fall through the opening.

In another version of the invention, the supports are connected to each other at least at their lower ends to limit the length of the aforementioned opening. As a result, only packagings having a diameter less than the distance between the aforementioned protuberances and with a length less than the distance between the aforementioned connections drop through the opening.

Arranged in a preferred version of the invention is a frame through which the packagings pass on their way to the pressing section, i.e. to the second sorting stage. In connection with this, the frame comprises a second section of the loader and prevents the transfer of packagings having excessively large axial lengths and/or diameters to the second sorting stage.

In the pressing section, the loader interacts with the pressing members to place the packagings in the correct position in relation to these members, in which position the pressing organs make contact with the packagings in the course of their movement towards each other and compress them. The opening of the loading member has no protuberances in a limited area with the result that in this area the opening is larger as it is limited only by the vertical supports. This widening of the opening has a position which coincides mainly with the position assumed by the packagings after they have been compressed by the pressing members. In the case of a can-like packaging, for example, which has been compressed in its axial direction the compressed packaging will drop through the wider portion of the opening when the pressing members commence moving away from each other (from the compression position) and when the axial length and diameter of the compressed packaging are less than the corresponding dimensions of the wider portion.

In yet another version of the invention, one of the pressing members is magnetic, whereby a packaging of magnetic material is returned to the first position, i.e. to the position occupied by the packaging when it was received by the device, when the loading member returns to the starting position.

Arranged in yet another version of the invention is a sensing and control means for sensing the occurrence of any magnetic material in the received packaging and, when such material is detected, for activating the drive means for moving the loader so that the loader is prevented from transferring the received packaging to the pressing section or alternatively so that transfer of the received packaging to the pressing section is permitted only if it is of magnetic material.

In still another version of the invention the movement of at least one of the pressing members is controlled by a device for determining the compressive force with which the packagings are compressed. In a preferred version a drive means is then connected to one of the pressing members via a drive mechanism in which is incorporated means for interrupting the movement of the pressing member at a predetermined maximum compressive force.

BRIEF DESCRIPTION OF THE DRAWING

The invention will be described in detail with reference to the figures of the drawing, wherein.

DETAILED DESCRIPTION OF PREFERRED EMBODIMENTS

Figure 1:
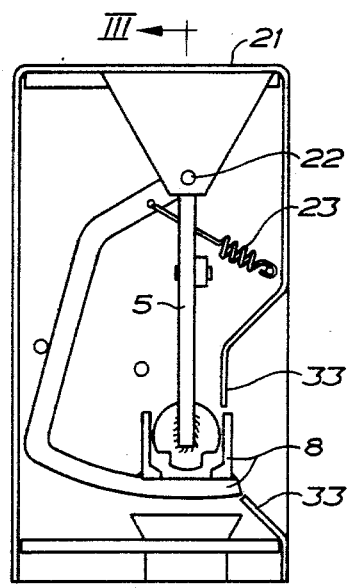
FIG. 1 shows a sorting device viewed from the side.

Shown in FIGS. 1–5 is a casing 21 in which is arranged a bearing 22 for the pivoted suspension of a loading member 8 for packagings 7. The loading member, which comprises a supporting member for the packagings, is arranged with side supports 31, 32 to limit an opening at the bottom in which the packagings are received. Reference character 18 indicates the opening at the bottom of the space. The loading member is moved by drive means (not shown) or by manual operation from the position shown in FIG. 2 to the position shown in FIG. 1. A spring 23 returns the loading member to the position shown in FIG. 2 after the drive means has been disengaged from the loading member 8. The casing 21 forms a frame 33 through which the loading member 8 passes when moving between the aforementioned positions. Together with the frame 33 the loading member 8 forms the first section of the device, called the loader, in which every packaging having dimensions within a predetermined range are sorted out for transfer to the second section of the device, i.e. to the pressing section.

With reference to the pressing section, FIGS. 1–5 show a first pressing member 1 and a second pressing member 2. The first pressing member is fastened to a lever 5 which, via a connecting rod 4, is joined to an eccentric 3 which, in turn, is connected to a drive means (not shown) for rotating the eccentric in the direction of the arrow. The first pressing member is arranged at one end of the lever 5 while the other end of the lever is pivoted in a bracket 6. The two pressing members 1 and 2 are arranged on either side of the opening 18. Below opening 18 is a funnel-like receiving member 24. Also in the vicinity of opening 18 is a sensing means 20 for sensing the number of packagings passing through the opening.

Figures 6, 7:
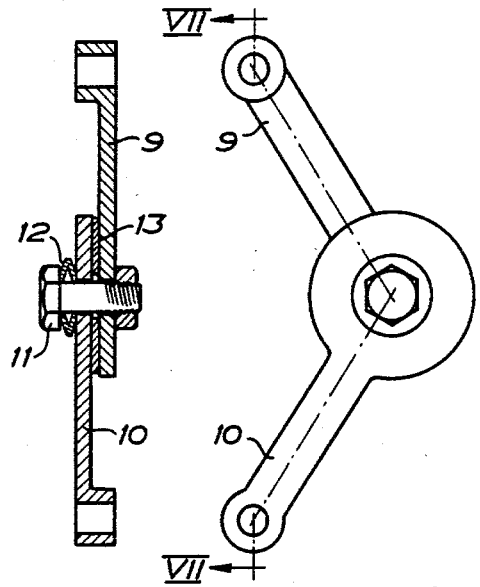
FIG. 6 is a side view of a drive mechanism consisting of two arms joined together by means of a friction connection.
FIG. 7 is a cross-section taken on line VII—VII in FIG. 6.

FIGS. 6–7 show a drive mechanism for the first pressing member in which connecting rod 4 is replaced by two arms 9 and 10 which form an angle to each other. The arms are joined together by a bolt 11 and spring washers 12 which exerts pressure on a friction connection 13 which enables arm 9 to move in relation to arm 10 with a certain degree of friction. As a result, in the event of an overload on the device due to a packaging having excessive mechanical rigidity, for example, being subjected to compression the component corresponding to connecting rod 4 is extended in that the angle between arms 9 and 10 changes, which in its turn causes compression of the packaging to cease. The version described makes it possible to set the maximum permissible compressive force for compressing the packaging. If this value is exceeded, compression of the packaging ceases and it cannot pass through the opening 18. When the pressing member returns to the position shown in FIG. 3, lever 5 abuts against a stop 14 (FIG. 5) and causes the arms 9 and 10 to return to their original positions relative to each other.

In certain applications, lever 5 is fitted with an articulation which is pretensioned in such a manner that the joint is not activated until the load exceeds a certain value. In this arrangement, the packaging is also not compressed to the final shape and it will not pass through the opening 18.

Other versions of the invention are also possible, such as with a telescopic connecting rod 4 which in the event of an overload is activated and can in such manner be extended. A heavily pretensioned spring also comprises an alternative.

Figure 8:
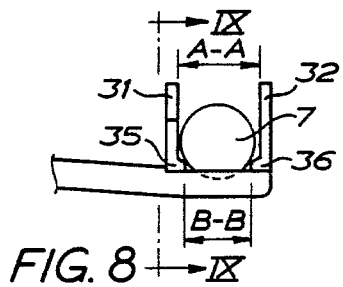
FIG. 8 shows a detail diagram of a loading member viewed from the side.
Figure 9:
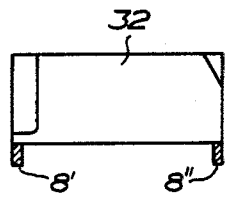
FIG. 9 is a sectional view of the loading member taken on line 9—9 in FIG. 8.
Figure 10:
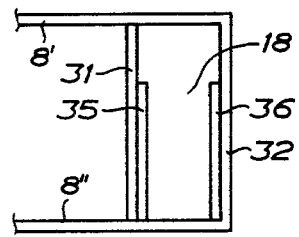
FIG. 10 is a top plan view of the loading member.

FIGS. 8–10 show in greater detail how the loading member 8 of the loader is arranged when it is specially adapted to receive cylindrical packagings. The side supports 31, 32 are then arranged at a distance A—A from each other which is slightly greater than the diameter of the packagings 7 and are also at their lower edges provided with protuberances 35, 36 facing each other and limiting the opening 18 to the width designated B—B. A limited area of the opening has no protuberances and the result is that in this area the opening is wider and limited solely by the vertical supports. The position of this wider portion of the opening is adapted to the position occupied by a compressed packaging 7'. For example, the wider portion is situated in the area at one end of the opening as shown in FIG. 10. The figures also show how the two side supports 31, 32 are connected to each other to limit the length of opening 18 to a value corresponding to a certain established minimum length of the packagings.

Figure 2:
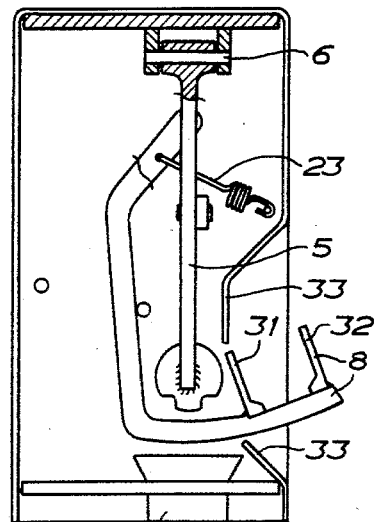
FIG. 2 shows, partially in section, a sorting device viewed from the side.
Figure 3:
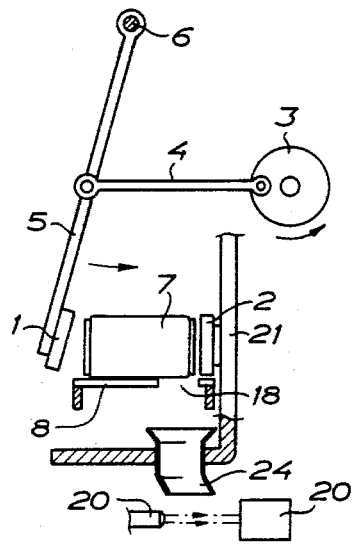
FIG. 3 shows a simplified cross-section taken on line III—III in FIG. 1 with a packaging placed in the sorting device.
Figure 4:
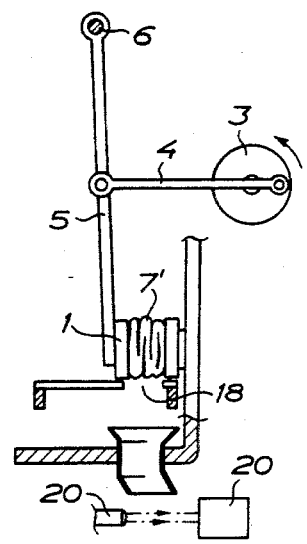
FIG. 4 shows the same cross-section as in FIG. 3 after the packaging has undergone axial compression.
Figure 5:
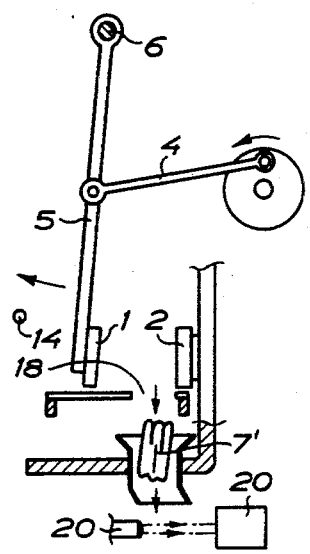
FIG. 5 shows the same cross-section as in FIG. 3 and with the packaging leaving the sorting device.

A packaging 7 is placed on supporting member 8 when this member occupies the position shown in FIG. 2. A packaging having a diameter within the range between the distances A—A and B—B and having an axial length less than the distance between the connections between the vertical supports 31, 32 is thereby carried by the supporting member 8 and occupies the position shown in FIG. 8. A packaging having a larger diameter rests on the upper edges of the supports 31, 32 while a packaging having a smaller diameter and with a length shorter than the distance between the connections drops down through the opening 18 and is thus sorted out. The drive means for moving the loading member to the pressing section now begins to move the loading member. A packaging resting on the upper edges of the supports 31, 32 is then brought up against the frame 33, whereby the packaging is either dislodged by the frame or further movement of the loading member is prevented. Packagings of excess diameter or excess axial length are sorted out in this way.

Packagings which are not sorted out in the loader by means of the process described in the previous paragraph are transferred by the continued movement of the loading member to the pressing section as shown in FIG. 1. Following this the drive means for rotating eccentric 3 starts and the first pressing member is moved from the position shown in FIG. 3 to the position shown in FIG. 4. In the case of a packaging, the mechanical strength of which is within a predetermined interval, the packaging 7 is compressed and assumes the shape in FIG. 4. The first pressing member has then been moved to a position beside the wider portion of the opening 18 and the packaging has thus been compressed so that the space it occupies between the first and the second pressing members is less than the length of the wider portion of the opening 18. The continued rotation of the eccentric moves the first pressing member back to its starting position and the compressed packaging 7' drops through the opening into the funnel-like receiving member 24. Where applicable, the falling packaging is recorded by the sensing means 20. Compressed packagings 7' which drop down through the opening 18 accordingly correspond to returned packagings which fulfill certain established criteria in regard to length, diameter and mechanical strength. Sorting has been carried out in two sorting stages where the first sorting stage takes place in the first section (the loader) of the device and the second sorting stage takes place in the second section (the pressing section) of the device.

The version shown in FIGS. 6 and 7 achieves a limitation of the maximum compressive force for compressing the packagings. Packagings having excessively high axial strength cause an extension of the component corresponding to connecting rod 4 in that the angle of arms 9 and 10 changes, which, in turn, causes compression of the packagings to cease. Accordingly, the described version makes it possible to set the maximum permissible compressive force for compressing the packagings. If this value is exceeded, compression ceases and the packagings cannot pass through the opening 18. When loading member 8 returns to the position shown in FIG. 2 the packagings are returned to their original position (FIG. 2).

In an alternative version of the invention, the connections shown in FIG. 10 between the supports 31, 32 are so positioned that cylindrical packagings having a diameter less than the width B—B always drop down through the opening between the protuberances of the supports regardless of the axial length of the packagings.

In still another alternative version of the invention, the distance between the connections exceeds the corresponding distance in frame 33. As in the preferred version described earlier, the maximum length of the packagings which are transferred to the pressing section is then determined through the interaction between loading member 8 and frame 33.

In certain versions, one of the pressing members 1, 2 is magnetic, with the result that packagings of magnetic material are retained by the magnetic pressing member when the pressing members move away from each other. When the loading member 8 returns to the position shown in FIG. 2 the packagings are returned to a position corresponding to the original loading position.

In an additional version one or more means for detecting the presence of magnetic material in the received packagings are arranged in the vicinity of the loader and then principally in the vicinity of loading member 8. In accordance with known techniques, the means for detecting magnetic material activates drive means, for example, for moving the loader to prevent the loader from moving to the pressing section of the device on detection of magnetic material in packagings placed in the loader or alternatively solely to transfer packagings of magnetic material to the pressing section.

In the above description the final dimensions of the compressed packaging 7' are stated to comprise a sorting criterion. It is evident from the description that in an alternative version the device shown is also suitable for using the dimensional diminution of the packagings (the magnitude of the movement of the pressing members towards each other after they have made contact with both ends of a packaging) as a sorting criterion. The dimensional diminution is then determined by known techniques.

The version described above in which opening 18 is arranged in the loader (supporting member) 8 is in certain applications replaced by versions in which the opening is arranged in a frame, for example, mounted on the housing of the device. In this connection, the device is designed principally to permit the return of the supporting member to the position shown in FIG. 2 during the compression process or immediately upon conclusion thereof.

I claim:

1. A device for sorting out and compressing packagings, principally of can type having overall dimensions within a predetermined interval in regard to length and diameter, for example, from packagings having dimension deviating from within said interval, said device comprising two sorting stages, one of said two sorting stages including a pivoted supporting member for carrying the packagings and a frame with an opening through which the supporting member is movable to the second stage, the second sorting stage including pressing members cooperating with the supporting member to effect axial compression of the packaging carried by said supporting member, the opening of the frame being of a size which limits the dimensions in at least one direction of the packaging passing through the opening, said second stage being provided with a second opening through which compressed packagings pass, whereby the second opening maximizes the axial length of the compressed packagings which pass through the second opening and are thereby sorted out.

2. A device as in claim 1, wherein the supporting member is provided with the second opening, said second opening having a substantially rectangular shape and facing downwards.

3. A device as in claim 2, wherein said second opening is provided with protuberances facing the centerline of the opening along at least half the length of the opening and at a distance from each other slightly less than a certain established diameter of the packagings, whereby packagings having a diameter less than the minimum value according to the predetermined interval drop through the second opening when attempts are made to place them on the supporting member and their movement through the frame is prevented.

4. A device as in claim 3, wherein said member includes vertical supports flanking the second opening and at a distance from each other slightly greater than a certain established diameter of the packagings so that packagings having a diameter in excess of the maximum value according to the predetermined interval are prevented from being received by the supporting member and from being carried through the frame.

5. A device as in claim 4, wherein said supports being connected to each other at least at their ends so as to limit the length of the downwards directed second opening which is formed between said protuberances and between the supports respectively whereby packagings having an axial length and a diameter less than the minimum value according to the predetermined interval drop through said second opening if attempts are made to place them on the supporting member and their transfer through the frame is thus prevented.

6. A device as in claim 1, wherein the position of said second opening substantially coincides with the position of the packagings in the final phase of their compression.

7. A device as in claim 1, wherein one of the pressing members is magnetic, whereby packagings of magnetic material are returned to a first position outside the opening in the frame upon return of the pivoted supporting member to the starting position.

8. A device as in claim 1, wherein at least one of the pressing members is connected to a drive means via a drive mechanism which includes means for interrupting the movement of the said one pressing member at a predetermined maximum compressive force.

9. A device as in claim 1 comprising sensing and control means for sensing the presence of magnetic material in a received packaging and on detection of such material for activating drive means for preventing the supporting member from moving to the second sorting position.

* * * * *